United States Patent
Gao et al.

(10) Patent No.: US 11,380,897 B2
(45) Date of Patent: Jul. 5, 2022

(54) PREPARATION METHOD OF GRAPHENE FLOWER AND USE OF GRAPHENE FLOWER IN LITHIUM SULFUR BATTERY

(71) Applicant: ZHEJIANG UNIVERSITY, Hangzhou (CN)

(72) Inventors: Chao Gao, Hangzhou (CN); Hao Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 384 days.

(21) Appl. No.: 16/473,255

(22) PCT Filed: Dec. 29, 2017

(86) PCT No.: PCT/CN2017/119938
§ 371 (c)(1),
(2) Date: Jun. 25, 2019

(87) PCT Pub. No.: WO2018/121751
PCT Pub. Date: Jul. 5, 2018

(65) Prior Publication Data
US 2020/0152988 A1    May 14, 2020

(30) Foreign Application Priority Data
Dec. 30, 2016 (CN) .......................... 201611262275.8

(51) Int. Cl.
*H01M 4/62* (2006.01)
*C01B 32/184* (2017.01)
(Continued)

(52) U.S. Cl.
CPC ........... *H01M 4/625* (2013.01); *C01B 32/184* (2017.08); *H01M 4/139* (2013.01); *H01M 4/362* (2013.01);
(Continued)

(58) Field of Classification Search
CPC ...... H01M 4/625; H01M 4/139; H01M 4/362; H01M 4/38; H01M 10/052; C01B 32/184; C01B 2204/22
See application file for complete search history.

(56) References Cited

U.S. PATENT DOCUMENTS

| 6,511,934 B1 * | 1/2003 | Cook ..................... B01J 31/143 502/103 |
| 2009/0235721 A1 * | 9/2009 | Robinson ................. G01N 5/00 73/31.05 |
| 2014/0272610 A1 | 9/2014 | Amine et al. |

FOREIGN PATENT DOCUMENTS

| CN | 101993065 A | 3/2011 |
| CN | 102674315 A | 9/2012 |

(Continued)

OTHER PUBLICATIONS

Moreno et al., Lithium battery using sulfur infiltrated in three-dimensional flower-like hierarchical porous carbon electrode, Materials Chemistry and Physics, vol. 180, Sep. 1, 2016 pp. 82-88 (Year: 2016).*

(Continued)

*Primary Examiner* — Helen Oi K Conley

(57) ABSTRACT

Disclosed in the present disclosure is a preparation method of a graphene flower, mainly lying in spray-drying graphene oxide solution to obtain a graphene oxide flower and then performing reduction on the same to obtain a graphene flower. Also disclosed in the present disclosure is use of the graphene flower in a lithium sulfur battery. The present disclosure is easy to operate, low cost, and suitable for scaled production, can improve the rate capability of a lithium sulfur battery while ensuring the high energy ratio of the lithium sulfur battery, thus greatly improving the energy density thereof, and can be applied in the field of high energy storage material and devices.

8 Claims, 3 Drawing Sheets

(51) Int. Cl.
  *H01M 4/139* (2010.01)
  *H01M 4/36* (2006.01)
  *H01M 4/38* (2006.01)
  *H01M 10/052* (2010.01)

(52) U.S. Cl.
  CPC .......... *H01M 4/38* (2013.01); *H01M 10/052* (2013.01); *C01B 2204/22* (2013.01); *C01P 2004/03* (2013.01); *C01P 2004/04* (2013.01)

(56) References Cited

FOREIGN PATENT DOCUMENTS

| CN | 103204497 A | 7/2013 |
| CN | 104752682 A | 7/2015 |
| CN | 106602063 A | 4/2017 |
| JP | 2011219372 A | 11/2011 |
| JP | 2013539193 A | 10/2013 |
| JP | 20149104 A | 1/2014 |

OTHER PUBLICATIONS

Wang et al., Three-Dimensional flower-like and hierarchical porous carbon materials as high-rate performance electrodes for supercapacitors, Elsevier, Carbon, 2014, pp. 119-127 (Year: 2014).*

Parviz et al., Tailored Crumpling and Unfolding of Spray-Dried Pristine Graphene and Graphene Oxide Sheets, Small Journal 2015, No. 22, pp. 2661-2668 (Year: 2015).*

Notice of reasons for refusal (2019-535263); dated Jul. 17, 2020.

Supplementary European Search Report (17888017.5); dated Jul. 7, 2020.

Chen,Chen et al., "Redissolution of Flower-Shaped Graphene Oxide Powder with High Density", Mar. 4, 2016.

* cited by examiner

PREPARATION METHOD OF GRAPHENE FLOWER AND USE OF GRAPHENE FLOWER IN LITHIUM SULFUR BATTERY

TECHNICAL FIELD

The present disclosure relates to a preparation method of a graphene flower and use of the graphene flower in a lithium sulfur battery.

BACKGROUND

Lithium sulfur batteries have become one of the most promising energy storage system due to their ultra-high energy density. However, due to the low conductivity of the sulfur itself, the construction of a positive electrode of a lithium sulfur battery with high load and high surface density has always been an important issue in the field of lithium sulfur. Recently, the addition of graphene so as to improve the electrical conductivity of the positive electrode and thus improve the energy density thereof has attracted more and more attention from researchers.

Graphene is an ultra-thin two-dimensional nanomaterial with a thickness of only 0.34 nm. Graphene has ultra-high electrical conductivity and carrier mobility, which makes it have great application value in the field of lithium sulfur battery materials. However, at present, the method for large-scale preparation of graphene is mainly oxidation, which will destroy the structure of graphene, while graphene without defects is mainly obtained by vapor deposition, making it impossible to produce on a large scale.

SUMMARY

An object of the present disclosure is to provide a preparation method of a graphene flower and use of the graphene flower in a lithium sulfur battery, aiming to overcome the shortcomings of the related art. In a lithium sulfur battery, an area specific capacity of a sulfur positive electrode can reach up to 5.2 mAh/cm$^2$, which greatly improves the electrochemical performance of the lithium sulfur battery.

The object of the present disclosure is achieved by the following technical aspect: a preparation method of a graphene flower, including steps as follows:

1) dissolving a graphene oxide raw material in a solvent and stirring to obtain a graphene oxide solution with a mass percentage of 0.01%-2%;

2) spray-drying the graphene oxide solution to obtain graphene oxide flower powder; and 3) performing reduction on the graphene oxide flower by using a reducing agent or by high-temperature heat treatment to obtain the graphene flower.

Furthermore, the solvent in the step 1) is selected from a group consisting of deionized water, N-methyl-2-pyrrolidone, N, N-dimethylformamide, N, N-dimethylacetamide, dimethyl sulfoxide, sulfolane, ethanol, n-butanol, acetonitrile or a mixture thereof at any ratio.

Furthermore, a temperature for the spray-drying in the step 2) is 60-200° C., and a diameter of a spray nozzle is 0.1-100 microns.

Furthermore, the reducing agent the step 3) is selected from a group consisting of an aqueous solution of hydrogen iodide with a volume percentage being 5%-50%, a sodium ascorbate solution, and hydrazine hydrate vapor, and the high-temperature heat treatment is carried out at 1000-3000° C. in nitrogen or argon atmosphere for a time of 10-1000 minutes.

Use of a graphene flower in a lithium sulfur battery is provided. The use is specifically as follows:

(1) mixing the graphene flower with sulfur, and performing co-heating in inert gas atmosphere;

(2) mixing a graphene flower-sulfur complex, adhesive and an electric-conductive agent to prepare slurry, coating the slurry on a current collector, and performing drying; and (3) assembling the dried current collector with a negative electrode, a separator, electrolyte and a battery packaging, to obtain a lithium sulfur battery with the graphene flower-sulfur complex as a positive electrode thereof.

Furthermore, in the step 1, a mass ratio of the graphene flower to the sulfur is 1:9-9:1, the inert gas is selected from a group consisting of nitrogen, argon and a mixture thereof, and a temperature for the co-heating is 100-400° C. and a time for the co-heating is 10-1000 minutes.

Furthermore, in the step 2, a mixing ratio of the graphene flower-sulfur complex, the adhesive and the electric-conductive agent is 9:0.5:0.5-5:2.5:2.5, and the adhesive is selected from a group consisting of polyvinylidene fluoride, sodium carboxymethyl cellulose, styrene-butadiene rubber group, water, N-methyl pyrrolidone and a mixture thereof at any ratio; the electric-conductive agent is selected from a group consisting of acetylene black, Ketjen black, SuperP, graphene, carbon nanotubes, C60 and a mixture thereof at any ratio; and the current collector is selected from a group consisting of aluminum foil, copper foil, nickel foil, carbon-clad aluminum foil, carbon paper and carbon cloth.

Furthermore, in the step 2, a coating thickness is 1-100 microns, a drying temperature is 40-100° C., and a drying time is 1-100 hours.

Furthermore, in the step 3, the negative electrode is selected from lithium metal, lithium aluminum alloy, lithiated silicon, lithiated carbon or a mixture thereof at any ratio; the separator is selected from glass carbon fiber, polypropylene separator and polyethylene separator; a solute of the electrolyte solution is selected from lithium hexafluorophosphate, lithium bistrifluoromethyl sulfonyl imide, lithium nitrate, lithium polysulfide or a mixture thereof, and the solvent is selected from 1,3-dioxolane, ethylene glycol dimethyl ether, triethylene glycol dimethyl ether, diethyl carbonate or a mixture thereof at any ratio; and the battery packaging comprises a button battery case, a soft-packaging battery case and a stainless steel battery case.

The graphene flower-based lithium sulfur battery prepared by the present disclosure has both the high rate performance of the graphene battery and the high energy density of the lithium sulfur batter in addition to the high load and the high surface density of the complex, such that it possesses high power density and high energy density. After the lithium sulfur battery is assembled, high energy density is presented, which is three times as high as the reported energy density of lithium sulfur batteries. The material required by such lithium sulfur batteries can be produced in large quantities with low cost, which will be of great practical value in electric vehicles and energy storage in the future.

DESCRIPTION OF EMBODIMENTS

Figure 1:
FIG. 1 shows a physical picture of a graphene flower prepared by the present disclosure.
Figure 2:
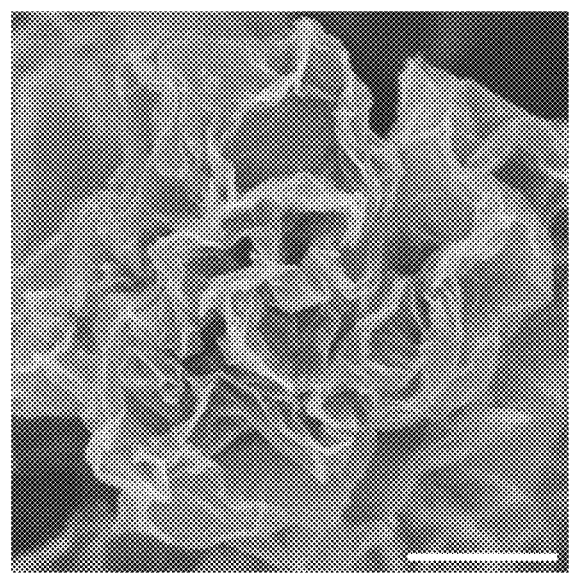
FIG. 2 shows a scanning electron microscope photograph of a graphene flower prepared in Embodiment 3.
Figure 3:
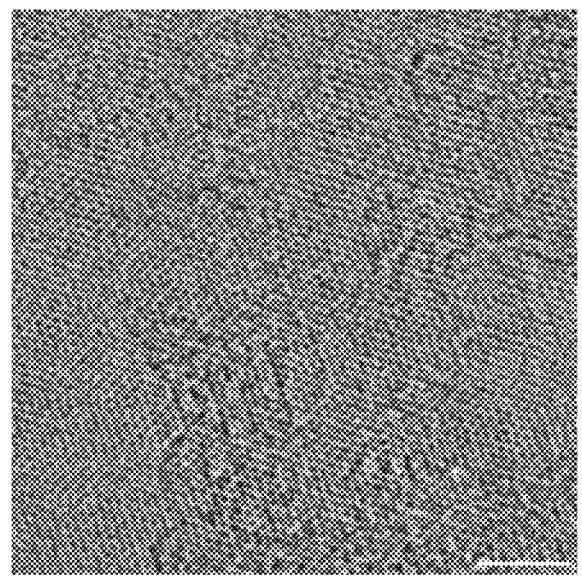
FIG. 3 shows a transmission electron microscope photograph of a graphene flower prepared in Embodiment 3.
Figure 4:
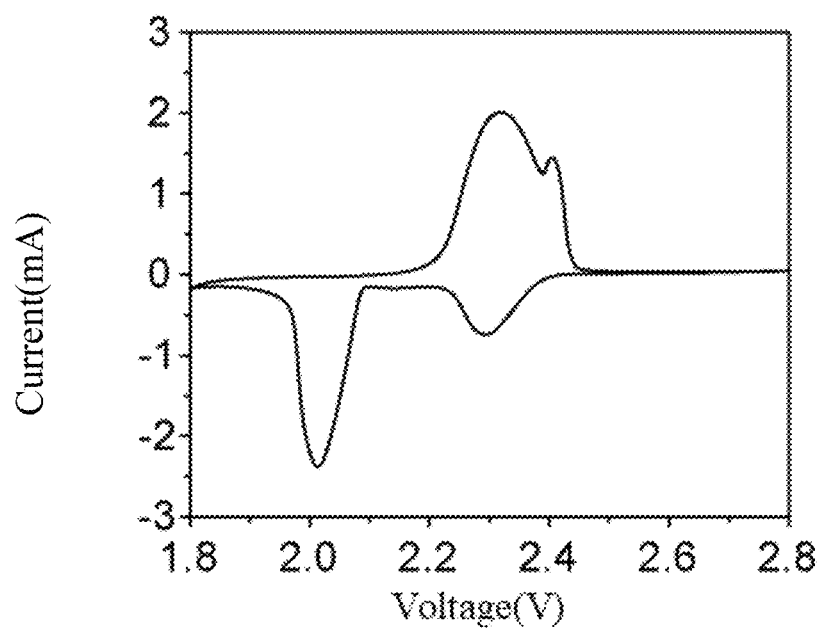
FIG. 4 shows cyclic voltammetry curves of a graphene flower-based lithium sulfur battery prepared in Embodiment 3.
Figure 5:
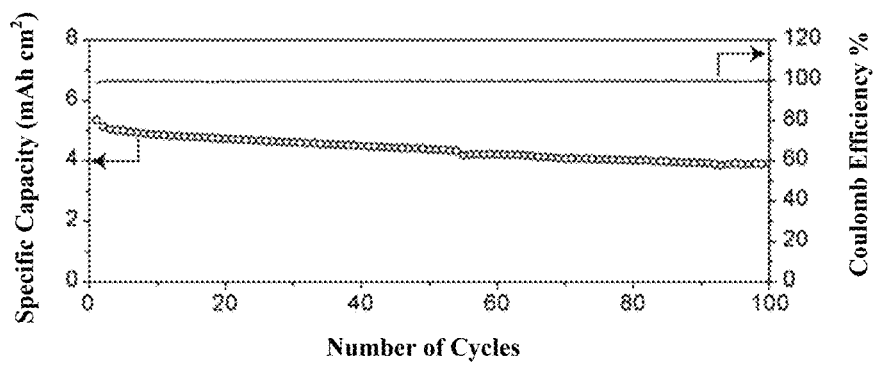
FIG. 5 shows cyclic performance curves of a graphene flower-based lithium sulfur battery under different constant current charge-discharge conditions.

Improving the performance of batteries by increasing the defect concentration of carbon materials is the key research target of the skilled persons in the art. The electrical conductivity of the carbon material with high-defect concentration hasn't reached 100 S/cm until now, and due to its relatively low electrical conductivity, when it is applied to lithium sulfur batteries, there are disadvantage of being unable to greatly improve the electrical conductivity of the active material and then reduce the energy density and power density. The present disclosure provides a new way to overcome the technical bias in the field and uses a graphene flower (an electrical conductivity being greater than 200 S/cm, a surface density being greater than 4.5 mg/cm$^2$ while a defect density being smaller than 0.0276) as the carrier of sulfur in a lithium sulfur battery so as to improve the load amount and performance of the positive electrode. The present disclosure will be described in details by embodiments, which are only used for further illustration of the present disclosure and should not be construed as a limitation of the scope of the present disclosure. Some non-essential changes and adjustments made by technicians in the field according to the contents of the present disclosure belong to the scope of the present disclosure.

Embodiment 1

1) 1 pbw (parts by weight) of graphene oxide is dissolved in 1000 pbw of deionized water and then stirring is carried out, so as to obtain an aqueous solution of graphene oxide uniformly dissolved and dispersed.

2) At 120° C., a 10-micron spray head is used for spray-drying the graphene oxide solution to obtain graphene oxide flower powder.

3) Reduction is performed on the graphene oxide flower by hydrazine hydrate vapor to obtain the high-defect graphene flower with a diameter of 4 microns. The electrical conductivity and the defect density are respectively 1.72 S/cm and 1.68 under tests.

4) The high-defect graphene flower is mixed with sulfur at a mass ratio of 1:4, and co-heating is carried out at 155° C. in nitrogen atmosphere for 12 hours.

5) 8 pbw of high-defect graphene flower-sulfur complex, 1 pbw of N-methyl pyrrolidone solution of polyvinylidene fluoride and acetylene black are mixed to prepare slurry, coating is performed on an aluminum foil, and drying is performed at 60° C. for 24 hours.

6) The dried electrode plate, lithium metal, porous polypropylene separator, 1,3-dioxolane/ethylene glycol dimethyl ether solution of lithium bistrifluoromethyl sulfonyl imide and a button battery case are assembled, such that a lithium sulfur battery having the high-defect graphene flower-sulfur complex as its positive electrode is obtained, and the maximum area specific capacity of its positive electrode is only 1.1 mAh/cm$^2$.

Embodiment 2

1) 1 pbw (parts by weight) of graphene oxide is dissolved in 1000 pbw of deionized water and then stirring is carried out, so as to obtain an aqueous solution of graphene oxide uniformly dissolved and dispersed.

2) At 120° C., a 10-micron spray head is used for spray-drying the graphene oxide solution to obtain graphene oxide flower powder.

3) Reduction is performed on the graphene oxide flower by heat treatment at 1000 Celsius degrees to obtain the low-defect graphene flower with a diameter of 4 microns. The electrical conductivity and the defect density are respectively 45 S/cm and 0.0521 under tests.

4) The low-defect graphene flower is mixed with sulfur at a mass ratio of 1:4, and co-heating is carried out at 155° C. in nitrogen atmosphere for 12 hours.

5) 8 pbw of low-defect graphene flower-sulfur complex, 1 pbw of N-methyl pyrrolidone solution of polyvinylidene fluoride and acetylene black are mixed to prepare slurry, coating is performed on an aluminum foil, and drying is performed at 60° C. for 24 hours;

6) The dried electrode plate, lithium metal, porous polypropylene separator, 1,3-dioxolane/ethylene glycol dimethyl ether solution of lithium bistrifluoromethyl sulfonyl imide and a button battery case are assembled, such that a lithium sulfur battery having the low-defect graphene flower-sulfur complex as its positive electrode is obtained, and the maximum area specific capacity of its positive electrode can reach 2.7 mAh/cm$^2$.

Embodiment 3

1) 1 pbw (parts by weight) of graphene oxide is dissolved in 1000 pbw of deionized water and then stirring is carried out, so as to obtain an aqueous solution of graphene oxide uniformly dissolved and dispersed.

2) At 120° C., a 10-micron spray head is used for spray-drying the graphene oxide solution to obtain graphene oxide flower powder.

3) Reduction is performed on the graphene oxide flower by heat treatment at 3000 Celsius degrees to obtain the graphene flower with a diameter of 4 microns. The electrical conductivity and the defect density are respectively 212 S/cm and 0.0276 under tests.

4) The graphene flower is mixed with sulfur at a mass ratio of 1:4, and co-heating is carried out at 155° C. in nitrogen atmosphere for 12 hours.

5) 8 pbw of graphene flower-sulfur complex, 1 pbw of N-methyl pyrrolidone solution of polyvinylidene fluoride and acetylene black are mixed to prepare slurry, coating is performed on an aluminum foil, and drying is performed at 60° C. for 24 hours;

6) The dried electrode plate, lithium metal, porous polypropylene separator, 1,3-dioxolane/ethylene glycol dimethyl ether solution of lithium bistrifluoromethyl sulfonyl imide and a button battery case are assembled, such that a lithium sulfur battery having the graphene flower-sulfur complex as its positive electrode is obtained, and the maximum area specific capacity of its positive electrode can reach 5.2 mAh/cm$^2$.

Embodiment 4

1) 2 pbw (parts by weight) of graphene oxide is dissolved in 100 pbw of deionized water and then stirring is carried out, so as to obtain an aqueous solution of graphene oxide uniformly dissolved and dispersed.

2) At 60° C., a 0.1-micron spray head is used for spray-drying the graphene oxide solution to obtain graphene oxide flower powder.

3) Reduction is performed on the graphene oxide flower by using an aqueous solution of hydrogen iodide with a volume percentage being 5%, to obtain the graphene flower with a diameter of 3 microns. The electrical conductivity and the defect density are respectively 30 S/cm and 1.3 under tests.

4) The graphene flower is mixed with sulfur at a mass ratio of 1:9, and co-heating is carried out at 400° C. in nitrogen atmosphere for 10 minutes.

5) 5 pbw of graphene flower-sulfur complex, 2.5 pbw of N-methyl pyrrolidone solution of polyvinylidene fluoride and 2.5 pbw of Ketjen black are mixed to prepare slurry, coating is performed on an aluminum foil, and drying is performed at 60° C. for 24 hours;

6) The dried electrode plate, lithium metal, porous polypropylene separator, 1,3-dioxolane/ethylene glycol dimethyl ether solution of lithium bistrifluoromethyl sulfonyl imide and a button battery case are assembled, such that a lithium sulfur battery having the graphene flower-sulfur complex as its positive electrode is obtained, and the maximum area specific capacity of its positive electrode can reach 4 mAh/cm$^2$.

Embodiment 5

1) The graphene oxide raw material is dissolved in n-butanol and stirred to obtain graphene oxide solution with a mass percentage being 0.01%.

2) Spray-drying is performed on the graphene oxide solution to obtain graphene oxide flower powder. A temperature for the spray-drying is 200° C. and a diameter of a spraying nozzle is 100 microns.

3) Reduction is performed on the graphene oxide flower by hydrazine hydrate vapor to obtain the graphene flower. The electrical conductivity and the defect density are respectively 27 S/cm and 1.44 under tests.

4) The graphene flower is mixed with sulfur, and co-heating is carried out at 100° C. in inert gas atmosphere for 1000 minutes. The mass ratio of the graphene flower to sulfur is 9:1.

(5) The graphene flower-sulfur complex, styrene-butadiene rubber and SuperP are mixed to prepare slurry, the slurry is coated on a current collector, and drying is performed. The mixing ratio of graphene flower-sulfur complex, styrene-butadiene rubber and SuperP is 9:0.5:0.5.

6) The dried current collector, a negative electrode, a separator, electrolyte and a battery packaging are assembled, such that a lithium sulfur battery having the graphene flower-sulfur complex as its positive electrode is obtained, and the maximum area specific capacity of its positive electrode can reach 5.4 mAh/cm$^2$.

What is claimed is:

1. A preparation method of a graphene flower, wherein comprising steps of:
   1) dissolving a graphene oxide raw material in a solvent and stirring to obtain a graphene oxide solution;
   2) spray-drying the graphene oxide solution to obtain graphene oxide flower powder; and
   3) performing reduction on the graphene oxide flower by using a reducing agent or by high-temperature heat treatment to obtain the graphene flower;
   wherein a temperature for the spray-drying in the step 2) is 60-200° C., and a diameter of a spray nozzle is 0.1-100 microns.
   wherein the reducing agent the step 3) is selected from a group consisting of an aqueous solution of hydrogen iodide with a volume percentage being 5%-50%, a sodium ascorbate solution, and hydrazine hydrate vapor, and the high-temperature heat treatment is carried out at 1000-3000° C. in nitrogen or argon atmosphere for a time of 10-1000 minutes.

2. The preparation method according to claim 1, wherein the solvent in the step 1) is selected from a group consisting of deionized water, N-methyl-2-pyrrolidone, N, N-dimethylformamide, N, N-dimethylacetamide, dimethyl sulfoxide, sulfolane, ethanol, n-butanol, acetonitrile or a mixture thereof at any ratio, and a mass percentage of the graphene oxide is 0.01%-2%.

3. Use of a graphene flower in in a lithium sulfur battery, the graphene flower being prepared by the method according to claim 1.

4. The use according to claim 3, wherein the use is specifically as follows:
   (1) mixing the graphene flower with sulfur, and performing co-heating in inert gas atmosphere;
   (2) mixing a graphene flower-sulfur complex, adhesive and an electric-conductive agent to prepare slurry, coating the slurry on a current collector, and performing drying; and
   (3) assembling the dried current collector with a negative electrode, a separator, electrolyte and a battery packaging, to obtain a lithium sulfur battery with the graphene flower-sulfur complex as a positive electrode thereof.

5. The use according to claim 4, wherein in the step 1), a mass ratio of the graphene flower to the sulfur is 1:9-9:1, the inert gas is selected from a group consisting of nitrogen, argon and a mixture thereof at any ratio, and a temperature for the co-heating is 100-400° C. and a time for the co-heating is 10-1000 minutes.

6. The use according to claim 4, wherein in the step 2), a mixing ratio of the graphene flower-sulfur complex, the adhesive and the electric-conductive agent is 9:0.5:0.5-5:2.5:2.5, wherein the adhesive is selected from a group consisting of polyvinylidene fluoride, sodium carboxymethyl cellulose, styrene-butadiene rubber, water, N-methyl pyrrolidone and a mixture of polyvinylidene fluoride, sodium carboxymethyl cellulose, styrene-butadiene rubber, water, or N-methyl pyrrolidone; the electric-conductive agent is selected from a group consisting of acetylene black, Ketjen black, SuperP, graphene, carbon nanotubes, C60 and a mixture of acetylene black, Ketjen black, SuperP, graphene, carbon nanotubes, C60; and the current collector is selected from a group consisting of aluminum foil, copper foil, nickel foil, carbon-clad aluminum foil, carbon paper and carbon cloth.

7. The use according to claim 4, wherein in the step 2), a coating thickness is 1-100 microns, a drying temperature is 40-100° C., and a drying time is 1-100 hours.

8. The use according to claim 4, wherein in the step 3), the negative electrode is selected from lithium metal, lithium aluminum alloy, lithiated silicon or lithiated carbon; the separator is selected from glass carbon fiber, polypropylene separator and polyethylene separator; a solute of the electrolyte solution is selected from lithium hexafluorophosphate, lithium bistrifluoromethyl sulfonyl imide, lithium nitrate, lithium polysulfide or a mixture thereof at any ratio, and the solvent is selected from 1,3-dioxolane, ethylene glycol dimethyl ether, triethylene glycol dimethyl ether, diethyl carbonate or a mixture thereof at any ratio;

and the battery packaging is selected from a button battery case, a soft-packaging battery case or a stainless steel battery case.

\* \* \* \* \*